United States Patent [19]

Becker

[11] Patent Number: 5,229,047
[45] Date of Patent: Jul. 20, 1993

[54] MANUFACTURE OF MICROCELLULAR FOAM TIRES

[76] Inventor: Roger Becker, c/o 2828B 54th Avenue, S.E., Calgary, Alberta, Canada, T2C 0Z7

[21] Appl. No.: 787,026

[22] Filed: Nov. 4, 1991

Related U.S. Application Data

[63] Continuation of Ser. No. 333,116, Apr. 4, 1989, abandoned.

[30] Foreign Application Priority Data

Apr. 7, 1988 [GB] United Kingdom ............... 8808105

[51] Int. Cl.⁵ .................................................. B29C 67/22
[52] U.S. Cl. ................................. 264/45.7; 264/46.7; 264/265; 264/271.1
[58] Field of Search ............... 264/45.7, 46.7, 46.9, 264/328.12, 265, 271.1

[56] References Cited

U.S. PATENT DOCUMENTS

| | | | |
|---|---|---|---|
| 3,331,423 | 7/1967 | Guin | 264/46.9 |
| 3,854,516 | 12/1974 | Burnell | 264/46.9 |
| 4,060,578 | 11/1977 | Kisbany | 264/46.9 |
| 4,248,811 | 2/1981 | Doyle et al. | 264/46.9 |
| 4,379,104 | 4/1983 | Koorevaar | 264/45.7 |
| 4,405,538 | 9/1983 | Saidla | 264/46.7 |
| 4,444,832 | 4/1984 | Mazzola et al. | 264/45.3 |
| 4,588,542 | 5/1986 | Pierce | 264/46.9 |
| 4,714,576 | 12/1987 | Cotton et al. | 264/46.6 |

FOREIGN PATENT DOCUMENTS

1119927 3/1982 Canada .
484986 9/1953 Italy ................... 264/46.9

*Primary Examiner*—Allan R. Kuhns
*Attorney, Agent, or Firm*—Killworth, Gottman, Hagan & Schaeff

[57] ABSTRACT

A method and apparatus for producing foam elastomer tires for various uses including bicycle and wheel chair tires with a minimum amount of wasted material. The method involves spin casting the tires wherein a mold with suitably designed tapers on the exterior surface is placed between press plates with corresponding annular tapers which cause the mold to be accurately centered within the press plates when the press is closed. The preblended liquid foamable materials are either poured directly into the mold or onto a surface immediately adjacent to the mold gate. One or more tension members are located within the mold such that either the incoming stream of preblended liquid foamable materials wet the tension member(s), or the tension member(s) lie more or less in the path of the expanding foamable material as it fills and forces its way out of the mold, or (preferably) both. This ensures that the foaming material completely covers the tension member(s) so that the tension members are fully embedded and form an integral part of the resulting tire. This novel arrangement provides a method of producing consistent, high quality tires.

7 Claims, 4 Drawing Sheets

MANUFACTURE OF MICROCELLULAR FOAM TIRES

This is a continuation of application Ser. No. 07/333,116, filed Apr. 9, 1989 now abandoned, the disclosure of which is incorporated herein by reference.

BACKGROUND OF THE INVENTION

This invention relates to improvements in the manufacture of microcellular foam tires particularly non-pneumatic or flat-proof tires.

Much work has been done since the early 1970's to overcome the inherent drawbacks in pneumatic tires, primarily the risk and expense of flat tires, without sacrificing their performance characteristics. A significant amount of attention has been directed to the use of polyurethane materials to achieve this end.

One of the earlier methods, which has since grown into a mature industry, is to fill an existing pneumatic tire with polyurethane foam. Such technology usually involves a two component room temperature system. The components are metered and blended together and then injected into the tire or tube cavity. The chemicals react to form polyurethane foam which expands and fills the volume normally occupied by compressed air.

The resulting tire is virtually flat proof and as such it has found application in industrial equipment where durability is a primary consideration. The main drawbacks are cost, in that urethane foam filled tire assembly is more expensive than an air filled assembly, as well as a noticeable reduction in the performance characteristics of the tire for some applications. Compared to a pneumatic tire, the mass is higher and the speed is limited as the urethane foam builds up and retains heat under the continual flexing resulting from rolling.

Another approach used was to replace the tire and tube with a hollow urethane elastomer shell. The urethane was stiff enough to support the load while the elastomeric nature of the urethane combined with the hollow interior allowed the tire to deflect to provide shock absorbing properties. Examples of tires produced using this approach are outlined in Canadian Patents 1,067,807, 1,099,205, and 1,112,550.

Tires made of an elastomer require some method of preventing them from elongating and rolling off the rim in use, as materials soft enough to provide a cushioning effect have relatively low tensile moduli. Such methods normally involve embedding into the tire a flexible tension member constructed of a material with the appropriate tensile stiffness. The objective is to have the resulting tensile stiffness of the composite tire such that the load required to stretch the tire on and off the rim is higher than the loads encountered in use. This allows the tire to be mounted, yet prevents it from inadvertently rolling off in normal usage.

Another method which can be used to hold the tire on the rim is to glue the tire to the rim. Although this method is technically feasible, it is too inconvenient to be readily acceptable for general sale and use.

Materials used as tension members include natural and synthetic fibre such as nylon, polyester and cellulose, and metal wires or coils. The general practice of using tension members in one form or another dates back at least to the beginning of this century.

A more recent innovation was to manufacture the tire from self-skinning flexible microcellular polyurethane foam. In this concept the foam interior provides the flexibility for the shock absorption characteristics, while the unfoamed skin on the outer surface provides the wear resistant riding surface. Naturally this concept maintains the "flat proof" characteristics by eliminating the need for compressed air. The tires are held on the rim through the use of tension members or glue as described earlier. A complete description of the concept can be found in Canadian Patent 1,032,455 and a detailed disclosure of a suitable urethane foam formulation is given in Canadian Patent 1,092,296.

Polyurethane foam tires are molded. In order to mold a tire shaped object the mold should be filled under some pressure to prevent the surface defects which will result if the urethane foam is unable to displace all of the air in the mold. This pressure can be obtained by pressurizing the liquid urethane components and then injecting them into a sealed mold, or, alternatively, by spin casting the tire. The preferred method to produce polyurethane foam tires is by spin casting as this is far simpler and more economical than injecting the liquid urethane under pressure.

Spin casting has been used extensively to produce products from various materials for many years. For example, descriptions of machinery and methods for spin casting products from various polymeric materials can be found in U.S. Pat. Nos. 4,479,769 and 4,519,971. Similarly methods of spin casting tires from liquid polymers such as urethane can be found in U.S. Pat. No. 3,751,551 and Canadian Patents 790,493, 790,498 and 875,065.

In order to produce the large number of tires needed to fill market requirements, a large number of molds are needed. Although metal molds are most certainly feasible for the production of molded foam tires, such molds are very expensive due to the complexity of the mold itself and the detail required in the mold cavity for such features as the tire tread.

For some molding processes such as injection molding, metal molds are essential because of high molding temperatures and/or pressures. However it has long been industry practice to produce molds from castable polymeric materials such as silicone, epoxy or urethane whenever the quantity of the required molds and the molding conditions are suitable.

This practice is suitable for the mass production of polyurethane foam tires. Rather than producing a large number of expensive metal molds, it is more effective to produce a metal "master mold" and then use that mold to cast the required number of production molds. As both the pressure and temperature experienced by the mold are low when spin casting polyurethane foam tires, urethane elastomers are suitable for use as production molds.

In summary, the preferred version of the prior art for nonpneumatic tires is to spin cast polyurethane foam tires with embedded tension members utilizing urethane molds.

The economics of spin casting polyurethane foam tires is such that the polyurethane materials are the largest single cost. It is therefore critical that the specific method used to produce the tire minimize the need for any excess urethane material over and above that required within the tire itself.

In the practice of the prior art, three primary causes of polyurethane material wastage have been identified.

One major cause of excess waste material is that existing methods of producing tires cannot ensure full coverage of the tension member by the urethane foam without wasting a considerable amount of material. Preblended liquid urethane components expand as they react and form urethane foam. Thus, to completely fill the mold cavity with unfoamed material is extremely wasteful as a volume of foam equal to the degree of expansion would be forced out of the mold. However, when only enough material to form the tire is introduced into a rotating mold, the liquid congregates at the outside diameter of the mold. As a result, tension members nearer the inside diameter of the mold are not immersed in and "wetted" by the liquid materials. Instead, the tension members must be engulfed by the expanding urethane foam which by this time is already in a state best described as semi-solid, so molding flaws result. The difficulty of covering the tension member by this expanding semi-solid foam is increased if the tension member is located near a wall of the mold as the expanding semi-solid foam must force its way between the tension member and the wall.

Various patents have been issued which to one extent or another address the issue of embedding reinforcing materials in a foamed product. These tend to fall into two broad categories. Some of these patents involve products where there is no significant difficulty in adequately covering the reinforcing member, such as U.S. Pat. Nos. 4,437,257, 4,338,270, 4,029,037, 3,991,146 and 3,511,736. Thus, although these patents discuss the need for reinforcements and methods of suspending them in the molds, the issue of complete covering of the reinforcement does not exist, and therefore is not addressed. Other patents, such as U.S. Pat. Nos. 4,702,866 and 4,461,736 specifically address the issue of causing the expanding foam to fully encapsulate and cover the embedded materials. However they accomplish this by more or less sealing the port by which the liquid raw materials were introduced. By blocking this potential exit to at least a significant extent, the expanding foam inside the mold cavity is placed under pressure which forces the foam in and around the embedded reinforcements. However blocking the material entry gate after injection of the liquid urethane is not practical in the case of spin casting foam tires.

Therefore in order to ensure the tension members are adequately covered when spin casting foam tires, the practice required by the prior art is to place excess material in the mold. In general, the greater the amount of material placed in the mold, the more likely that the tension members will be adequately covered. However this practice is costly in terms of waste material and therefore involves a compromise between the amount of material wasted with each tire produced and the number of tires rejected due to incomplete coverage of the tension member. Regardless, considerable material and money is wasted.

Another difficulty with prior art practice is caused by the need to have the mold accurately centered while being rotated. When liquid urethane is poured into a rotating mold, the liquid is distributed by centrifugal force. This force distributes the material according to the center of rotation of the mold, which does not correspond to the center of the mold itself when the mold is not accurately centered. The net effect is that portions of the mold which are closer to the center of rotation will receive less material than those which are further away. Therefore, if the mold is not properly centered, it will be necessary to overfill the more distant portions of the mold in order to adequately fill the portions of the mold closer to the center of rotation. The net result is that if the mold is not properly centered, excess material must be poured into the mold to ensure complete mold filling and adequate coverage of tension members which are normally located at the inner circumference of the tire.

The difficulty in centering the mold is increased by the use of urethane molds. This is because multiple urethane castings produced from the same mold can easily vary in dimension by plus or minus one half of one percent. For a typical tire mold, this can mean variations of over 3 mm. Thus when, as is often the case, the mold is a ring with inside and outside diameters approximately matching that of the tire to be cast, there are no consistent mold dimensions to use when attempting to center the mold mechanicaly.

The third difficulty is related to how the liquid material is fed into the mold. The standard method used by the prior art is to feed the material in more or less at the center of rotation, and then let centrifugal force distribute it out to the mold cavity. However this also leads to waste material, in that some method of distributing this material to the tire cavity such as runners or a flat plate is required, and some material adheres to this part of the mold or molding equipment rather than flowing into the cavity. This material is obviously wasted.

SUMMARY OF THE INVENTION

The object of the invention is to alleviate the problems enumerated above and especially to minimize the amount of materials required to spin cast a microcellular foam tire.

Thus in accordance with the invention in one aspect there is provided a method of producing foam tires having one or more tension members embedded therein, including the step of positioning one or more tension member(s) within a mold, said mold having means for admitting an incoming stream of preblended foamable liquid components and for releasing excess foam from the mold, characterized in that the tension member(s) are positioned in the mold such that:

(a) the tension member(s) is/are substantially wetted by the incoming stream of preblended liquid components, and/or (b) the tension member(s) are generally in the path of the foaming material as it expands its way out of the mold.

In a further aspect of the invention there is provided a mold for making foam tires which contains a substantially continuous annular gate through which a foamable material is introduced into the mold, and a means of supporting one or more tension members within said mold substantially in line with said gate.

In another aspect of the invention there is provided apparatus for producing foam tires including a mold having an annular gate through which a foamable material may be introduced into the mold and means for supporting a tension member within said mold substantially in alignment with said gate to assist in ensuring full coverage of the tension member by the foam material.

Preferably, said mold includes ledge means leading into said annular gate and on which foamable material is poured when in use to effect introduction of said material into the mold.

Still further, the invention provides an apparatus for spin casting foam tires comprising means for clamping a tire mold and rotating same about an axis; said clamping means and said mold including tapered faces which force the tire mold into a position substantially centered with the center of rotation of the mold when the clamping means is activated to clamp the mold.

The invention also provides an improved tire as manufactured by or in accordance with the foregoing features.

PREFERRED EMBODIMENTS OF THE INVENTION

Figure 1:
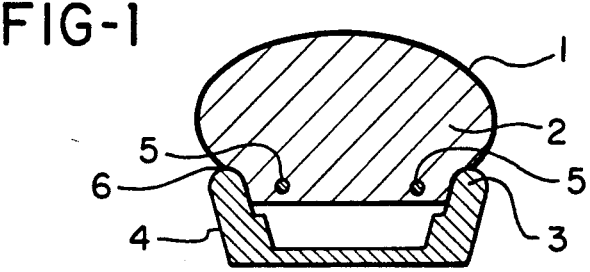
FIG. 1 illustrates the cross section of a typical prior art polyurethane foam tire.

FIG. 1 illustrates a typical cross section of a prior art polyurethane foam tire mounted on a rim. The tire consists of an integral high density skin 1, a low density inner volume 2, a bead seat 3 adapted to be mounted within the wheel rim 4, and annular tension members 5. Before being mounted, the diameter of tire shoulder 6 is somewhat smaller than the corresponding diameter of the wheel rim. The actual difference between the rim diameter and the unmounted tire shoulder diameter is determined by the modulus of elasticity of the tension member(s) and the side loads encountered in use. In general, the lower the tension member modulus, the greater the stretch required by the mounted tire to ensure the tire does not come off.

Figure 2:
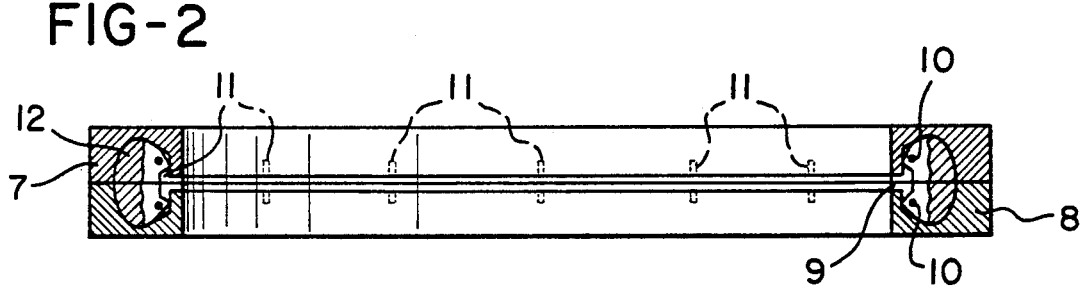
FIG. 2 illustrates the cross section of a typical prior art mold which has been filled with preblended liquid urethane components which have not yet begun to foam.

FIG. 2 illustrates a typical prior art tire mold The mold consists of two annular halves 7 and 8, and a more or less continuous circumferential gate 9. Suitable tension members 10 are suspended inside the mold on closely circumferentially spaced supports 11, which span the mold halves and, which may interrupt the continuity of gate 9. Preblended liquid urethane components 12 are injected into the mold under low pressure resulting from the mold being rotated.

Because the urethane expands as it foams, the amount of liquid initially introduced into the mold has a considerably smaller volume than the mold cavity. If the mold is not sealed and pressurized, the density of the resulting foam is affected by the amount of the foam which expands out of the mold through gate 9, with the density of the tire increasing as the amount expanding out of gate 9 increases.

Figure 3:
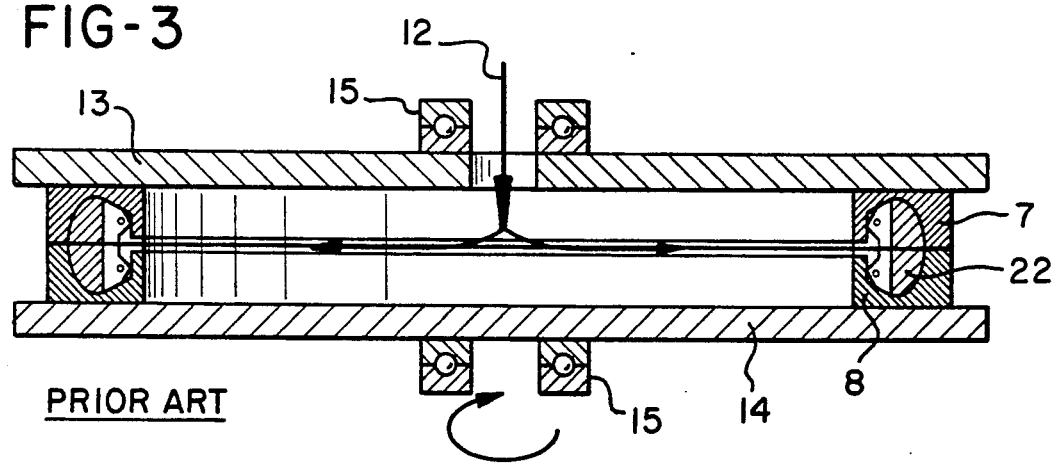
FIG. 3 illustrates the typical prior art fill method used to spin cast the tire.

FIG. 3 illustrates a typical spin cast procedure. Mold halves 7 and 8 are held between press plates 13 and 14, which, in turn, rotate on annular bearings 15 about a fixed axis thus causing the mold to rotate. The preblended materials 12 are poured in more or less at the center of rotation of the mold in the direction of the arrow, and they then flow out to the periphery of the mold under centrifugal force. This action leaves a residue of material 12 in the center, while the bulk of the material is distributed evenly about the center of rotation of the mold.

Figure 4:
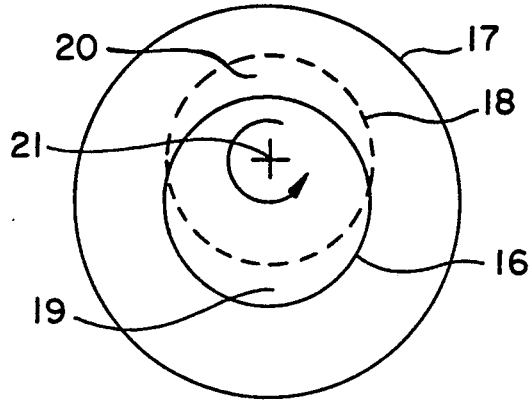
FIG. 4 illustrates how mold centering with respect to the center of rotation affects material distribution in the mold.

FIG. 4 illustrates the effect of not having the mold centered properly. Cicles 16 and 17 show the inner and outer diameters respectively of the mold cavity, while broken circle 18 illustrates an arbitrary fill point as the mold rotates about point 21. As can been seen, the section of the mold at 19 has been over filled while the section at 20 has not been filled, even though the actual diameter of 16 and 18 are exactly the same. Fill line 18 can represent either the liquid fill point or the point of maximum expansion after foaming. In this latter case, it can be seen that in order to adequately fill portion 20 of the mold, portion 19 would have to be over filled to an even greater extent, resulting in considerable waste material.

Figure 5:
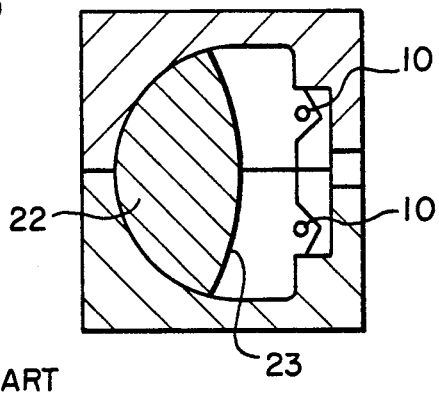
FIG. 5 illustrates the prior art tire mold cavity cross section as the urethane begins to foam.
Figure 6:
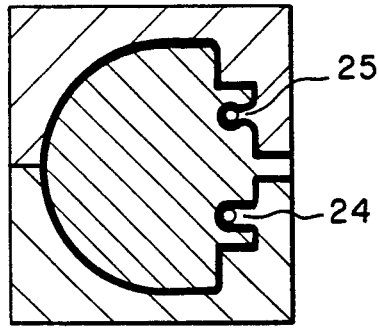
FIG. 6 illustrates typical prior art problems which can be encountered when trying to cover the tension member with methane materials.

FIG. 5 illustrates the prior art tire mold cavity as the urethane begins to foam. As the foaming urethane 22 is solidifying as it foams and expands, the expanding material wave front 23 is a semi-solid thin skin. When this wave front reaches the tension members 10 it must divide and go around them. Its semi-solid nature means that if the tension member is located near a wall as in FIG. 6, the foam may not be able to flow between the tension member and the wall, especially given the lower resistance alternative of flowing out the gate. Even if the wave front does completely pass the tension member, it may not close around the tension member as at 24, or it may leave a knit line as at 25. This knit line will appear as a visual flaw and potential weak point on the finished tire.

Figure 7:
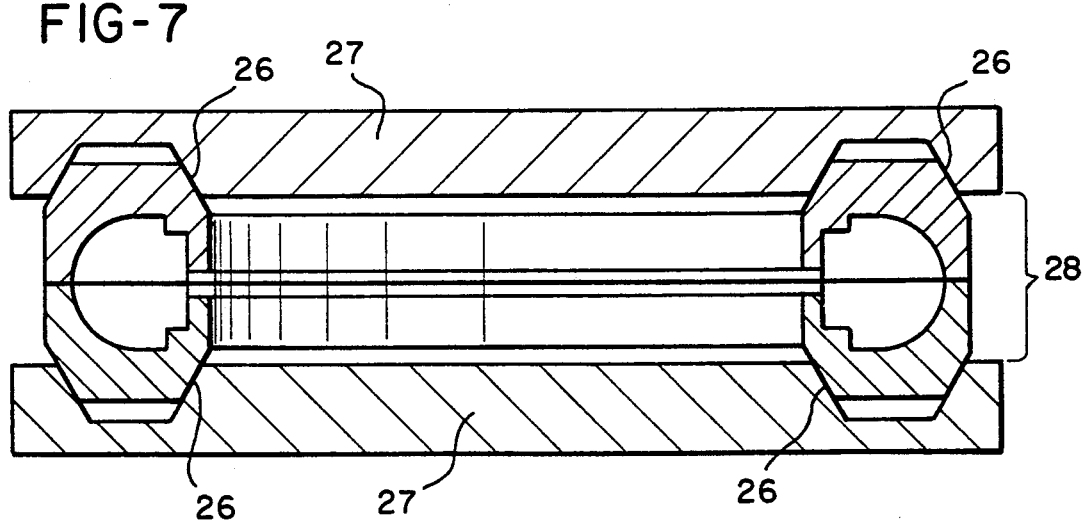
FIG. 7 illustrates the preferred form of the invention for centering the mold within the spin press plates.

FIG. 7 shows a preferred embodiment of the invention for ensuring that the mold is properly centered before pouring in the liquid urethane. The inside and outside diameters of the mold are provided with opposed annular sloping or tapered walls 26, and the spin press plates 27 are each provided with an annular groove, the side walls of which have a complementary slope or taper. This taper is chosen such that when the spin press plates close on the mold halves, a force is generated which pushes the mold in the appropriate direction until it is centered in the resulting grooves in plates 27. The minimum degree of taper of the annular walls of the mold halves is determined by the coefficient of friction between the mold and and plates, and can be easily calculated by anyone knowledgeable in the art of mechanical design. In general a maximum angle of 70 degrees referenced to the rotation axis is desirable. In essence, this design compensates for variations in mold diameter which can cause centering problems with a variation in the clamping distance 28 between press plates 27. For example, as the mold diameter gets larger, clamping distance 28 increases while the mold still remains centered in the press plates 27.

Figure 8:
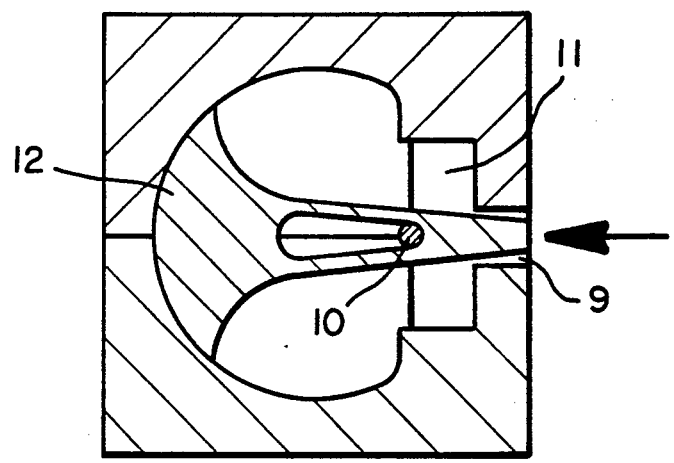
FIG. 8 illustrates the preferred manner of ensuring coverage of the tension member as the mold cavity is being filled with preblended liquid polyurethane.

FIG. 8 illustrates an embodiment of the invention which ensures that the tension members are fully covered by the expanding foam. As in FIG. 2 the continuous tension member(s) are suspended inside the mold on closely circumferentially spaced supports 11 which may interrupt the continuity of annular gate 9, which gate faces radially inwardly toward the rotation axis of the mold. The supports 11 are simple spaced bars or rods which extend between the mold halves and each having a notch or notches therein to receive and position the continuous tension member(s) 10. In the preferred embodiment, the tension member(s) are purposely located in the path of the incoming preblended unformed relatively low-viscosity liquid urethane material 12 as it flows in from gate 9. The liquid material 12 wets and adheres to the tension member 10 which is in line with the middle of the gate opening.

Figure 9:
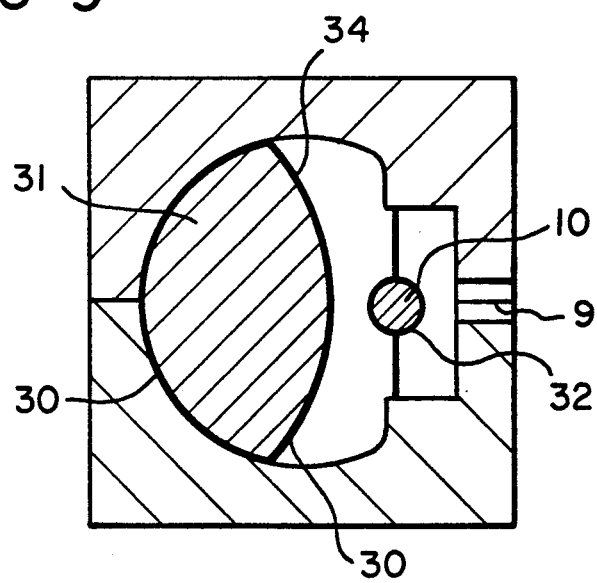
FIG. 9 illustrates how the use of the invention results in a well covered tension member and minimal molding flaws.

FIG. 9 shows that while tee majority of the material as it reacts and becomes more viscous, forms a skin 30 and begins to form foam 31 at the outer wall of the mold, it is also forming a skin 32 and foam 33 around the tension member 10. Also, when the foam wave front 34 reaches the centrally located tension member, it must enclose the tension member on its way out of gate 9. Thus the embodiment of the invention described above ensures that the tension member(s) are fully and solidly enclosed and embedded in the tire by two mechanisms. First of all, wetting the tension member(s) ensures that they will be surrounded by a urethane skin and, outside of the skin, by urethane foam. Secondly, by having the tension member(s) placed in the path of the expanding foam as it forces its way out of the mold, the foam does not have a lower resistance path available bypassing the tension member(s). The final result is a totally enclosed tension member without any visible exterior flaws or knit lines on the tire itself.

Figure 10:
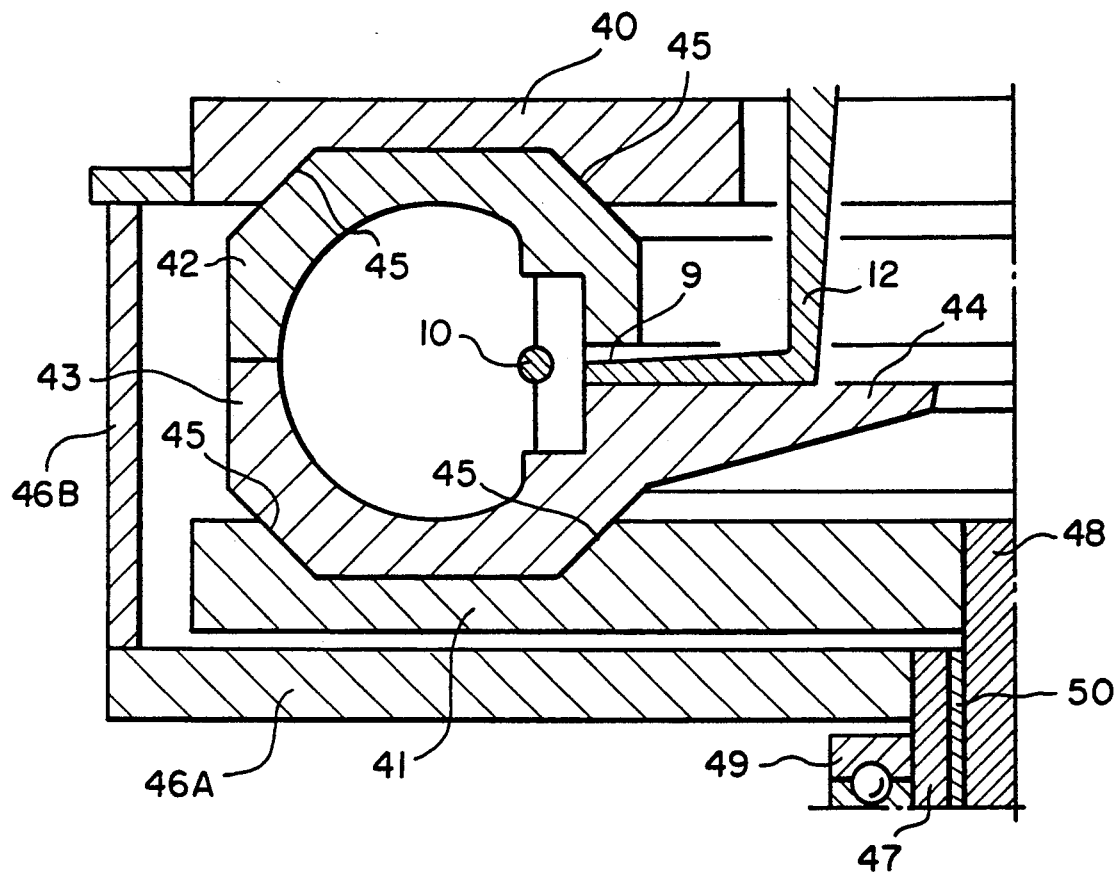
FIG. 10 illustrates the preferred form of the tire mold and associated structure in accord with the invention.

FIG. 10 shows the full preferred embodiment of the invention. Mold halves 42 and 43 have exterior opposed annular tapers 45 corresponding to similar complementary annular tapers defined by annular grooves in press plates 40 and 41. In other words, the annular tapers 45 in the press plates 40 and 41 serve to define one or more grooves in the plate which seat the mold halves. Within the mold halves 42 and 43 the tension member(s) 10 are located more or less in line with gate 9 for the reasons described above. The lower mold half 43 contains a radially inwardly extending annular extension or ledge 44 leading into gate 9 and onto which liquid urethane 12 is poured. This material then enters the mold cavity via gate 9. In this way the total amount of material contained in stream 12 is minimized as no extra material need be used to ensure full coverage of the tension member due to either a non-centered mold or incomplete coverage by the foaming material. At the same time, only minimal residual material is left outside the mold cavity as the material 12 is placed in the mold as close to the actual tire cavity as possible.

As the top press plate 40 must have a large inside diameter to allow pouring of material 12 near the inside diameter of the tire mold, support of plate 40 is provided by means of supports 46 which reach around lower plate 41 and which in turn are centered on the same bearing 49 as are support plate 41.

In order to open and close the press plates, plates 40 and 41 must move toward and away from each other. Thus, suitable sliding means using bushings are included. As shown in FIG. 10, plates 40 and 41 each have their own respective mounting shafts 47 and 48. Shaft 47 supports plate 40 via bearing 49 and supports 46, while shaft 48 supports plate 41 via bushing 50 which in turn is supported on bearing 49 via shaft 47. Support 46 consists of a horizontal member 46(a) which may be either a full plate or a number of spokes, and two opposing vertical members 46(b) which provide a connection between member 46a and top press plate 40. Shaft 47 is a tubular member which surrounds the central shaft 48 for relative axial motion therebetween. Suitable means for rotating the moulding assembly shown in FIG. 10 and for effecting relative axial motion between shafts 47 and 48 are provided but are not shown here since the construction of same will be apparent to those skilled in this art.

Figure 11:
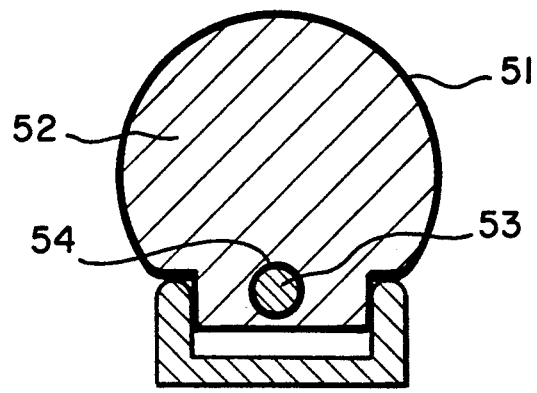
FIG. 11 illustrates a typical microcellular foam tire as produced by the apparatus and method as described herein.

FIG. 11 illustrates the resulting tire produced from the use of the apparatus as illustrated in FIG. 10. The tire is comprised of an external skin 51, interior foam body 52 and tension member(s) 53. A continuous interior skin surface 54 is formed around the tension member(s) 53 as a result of the initial wetting of the tension member when the foamable material was first introduced into the mold cavity as described above.

While certain exemplary embodiments have been described to explain and illustrate the invention, it will be apparent to those skilled in this art that various changes and modifications may be made without departing from the spirit or scope of the invention.

For example, although the disclosure speaks primarily of polyurethane foam tires, the invention is suitable for use with any foamable elastomeric material which can be cast in the liquid state.

Similarly a large number of materials can be used for the tension member. A single tension member could consist of one loop of a large cross section, or multiple loops of smaller cross section. Alternately a multitude of smaller, discrete tension members can be positioned substantially in line with the middle of the gate, as long as they are positioned such that the incoming stream of urethane components impinges either directly or indirectly onto the tension member(s), and/or the tension members lie more or less in the path of the foam wave front as it expands out through the gate.

Other variations can allow for the wetting of the tension member by introducing the preblended liquid urethane from the side wall of the mold. In still another configuration, there could be two gates in the mold, one through which the preblended liquid urethane is introduced into the mold without wetting the tension member(s), while the tension member(s) are located in front of the second gate through which the excess foam escapes from the mold.

The number of tapered faces on the mold and press plates may be reduced from the number shown in the preferred embodiment to as low as one tapered face on one of the press plates, as long as the taper provides sufficient lateral force to center the mold. Alternately the number of tapered faces could be larger than the number shown in the preferred embodiment by means of using double tapered annular faces located along the top and/or bottom faces of the mold and the corresponding press plates.

Instead of rotating the molds in a horizontal position about a vertical axis, the molds could be held in a vertical position or plane with a horizontal axis of rotation. This would allow the preblended liquid urethane to be poured directly into the gate without the need for the shelf 44 illustrated in FIG. 10.

It will of course be understood that the present invention has been described above purely by way of example, and modifications of detail can be made within the scope of the invention.

I claim:

1. A method of producing resilient non-pneumatic tires having at least one continuous annular tension member embedded therein, comprising:
   (a) providing an annular tire mold having an annular opening therein;
   (b) causing relatively low viscosity liquid tire-forming components to flow into the interior of the mold by way of said annular opening, which liquid component are capable of reacting together to form an expanding mass of tire forming material which becomes more viscous as the reaction proceeds;
   (c) prior to step (b), positioning the continuous annular tension member within the annular mold adjacent said annular opening and in alignment with said annular opening so as to be directly in the flow path of the liquid components as they flow into the mold interior via said annular opening such that the tension member becomes wetted by a first portion of the liquid components so that said first portion which has wetted the tension member begins to form a semi-solid layer around the tension member as the liquid components react together and become more viscous while a remaining second portion of the liquid components passes into the mold interior; and
   (d) allowing the remaining second portion of the liquid components to react and to expand to fill the mold interior and thence move toward the annular opening in consequence of which the reacting and expanding tire-forming material, as it becomes more viscous, is forced to flow toward and to surround and enclose the annular tension member which is positioned in said mold adjacent said annular opening together with the previously formed semi-solid layer of tire-forming material which has formed around said tension member, in consequence of which the tension member becomes fully enclosed and embedded in the material of the resulting tire on completion of the reaction and expansion of said tire-forming components.

2. The method of claim 1 including rotating said mold about a rotation axis to evenly distribute the liquid components within the mold by centrifugal force.

3. The method of claim 2 wherein said opening for admitting the liquid components into the mold includes a radially inwardly facing annular gate which surrounds said rotation axis, with said tension member being located adjacent to and in general alignment with the centerline of said gate so as to be wetted by the liquid components.

4. The method according to claim 3 including providing opposed press plates which clamp the mold therebetween for rotation about said axis, and cooperating taper means acting between said press plates and said mold for centering said mold relative to said axis as the press plates move toward each other to clamp the mold therebetween, the mold being removed from between the pres plates after being filled with foam material and another mold then being positioned and clamped therebetween.

5. A method of producing resilient non-pneumatic tires having at least one continuous annular tension member embedded therein, comprising:
   (a) providing an annular tire mold having an annular opening therein;
   (b) causing relatively low viscosity liquid tire-forming components to flow into the interior of the mold by way of said annular opening, which liquid components are capable of reacting together to form an expanding mass of forming material which becomes more viscous as the reaction proceeds;
   (c) prior to step (b), positioning the continuous annular tension member within the annular mold adjacent said annular opening and in alignment with said annular opening so as to be directly in the flow path of the liquid components as they flow into the mold interior via said annular opening such that the tension member becomes wetted by a first portion of the liquid components so that said first portion which has wetted the tension member begins to form a semi-solid foam layer around the tension member as the liquid components react together and become more viscous while a remaining second portion of the liquid components passes into the mold interior; and
   (d) allowing the remaining second portion of the liquid components to react and to expand to fill the mold interior with foam material and thence move toward the annular opening in consequence of which the reacting and expanding foam material, as it becomes more viscous, is forced to flow toward and to surround and enclose the tension member and the previously formed semi-solid layer of foam material which has formed around said tension member both of which are positioned directly in the path of the expanding foam material as it makes its way to said annular opening, in consequence of which the tension member becomes fully enclosed and embedded in the foam material of the resulting tire on completion of the reaction and expansion of said components.

6. The method of claim 5 including rotating said mold about a rotation axis to evenly distribute the liquid components within the mold by centrifugal force.

7. The method of claim 6 wherein said opening for admitting the liquid components into the mold includes an annular gate which surrounds said rotation axis, with said tension member being located adjacent to and in alignment with the centerline of said gate so as to be wetted by the liquid components.

* * * * *